United States Patent
Pospelov et al.

(10) Patent No.: US 12,514,891 B2
(45) Date of Patent: Jan. 6, 2026

(54) METHOD FOR ISOLATING MICROVESICULES FROM PLANTS OF THE AMARANTHACEAE FAMILY

(71) Applicants: Vladimir Evgenevich Gordeychuk, Krasnodar (RU); Vadim Igorevich Pospelov, Zurich (CH); Sergey Vladimirovich Rubtsov, Moscow (RU); Aleksandr Pavlovich Barsukov, Rostov-na-Donu (RU)

(72) Inventors: Vadim Igorevich Pospelov, Zurich (CH); Aleksandr Andreevich Abramov, Moscow (RU); Alisa Antonovna Petkevich, Moscow (RU)

(73) Assignees: Vladimir Gordeychuk, Krasnodar (RU); Vadim Pospelov, Zurich (CH); Sergey Rubtsov, Moscow (RU); Aleksandr Barsukov, Rostov-na-Donu (RU)

( * ) Notice: Subject to any disclaimer, the term of this patent is extended or adjusted under 35 U.S.C. 154(b) by 264 days.

(21) Appl. No.: 18/275,617

(22) PCT Filed: Jan. 25, 2022

(86) PCT No.: PCT/RU2022/000020
§ 371 (c)(1),
(2) Date: Aug. 3, 2023

(87) PCT Pub. No.: WO2022/169383
PCT Pub. Date: Aug. 11, 2022

(65) Prior Publication Data
US 2024/0100111 A1    Mar. 28, 2024

(30) Foreign Application Priority Data
Feb. 4, 2021    (RU) ........................... RU2021102559

(51) Int. Cl.
*A61K 36/21*    (2006.01)
(52) U.S. Cl.
CPC .......... *A61K 36/21* (2013.01); *A61K 2236/15* (2013.01); *A61K 2236/53* (2013.01)
(58) Field of Classification Search
None
See application file for complete search history.

(56) References Cited

U.S. PATENT DOCUMENTS

2013/0115241 A1    5/2013    Gho et al.

FOREIGN PATENT DOCUMENTS

| | | |
|---|---|---|
| CN | 115895998 A | 4/2023 |
| CN | 118424819 A | 8/2024 |
| CN | 119020256 A | 11/2024 |
| CN | 119405841 A | 2/2025 |
| EP | 3354272 A1 | 8/2018 |
| KR | 20230161719 A | 11/2023 |
| RU | 2481113 C2 | 5/2013 |
| RU | 2570636 C2 | 12/2015 |
| RU | 2608509 C1 | 1/2017 |
| RU | 2651521 C1 | 4/2018 |
| RU | 2825231 C1 | 8/2024 |
| RU | 2839436 C1 | 5/2025 |
| WO | 2016033695 A1 | 3/2016 |
| WO | 2021002571 A1 | 1/2021 |

OTHER PUBLICATIONS

Shtam et al., "Isolation of extracellular microvesicles from cell culture medium: Comparative evaluation of methods", Biochemistry (Moscow), Supplement Series B: Biomedical Chemistry, 2018, pp. 167-175, vol. 12, No. 2.
Giannini et al., "A Small Scale Procedure for the Isolation of Transport Competent Vesicles from Plant Tissues", Analytical Biochemistry, 1988, vol. 174, pp. 561-567.
Li et al., "Arrowtail RNA for Ligand Display on Ginger Exosome-like Nanovesicles to Systemic Deliver siRNA for cancer Suppression", Scientific Reports, 2018, vol. 8:14644, pp. 1-11.
Raimondo et al., "Citrus limon-derived nanovesicles inhibit cancer cell proliferation and suppress CML xenograft growth by inducing TRAIL-mediated cell death", Oncotarget, 2015, vol. 6:23, pp. 19514-19527.

*Primary Examiner* — Susan Hoffman
(74) *Attorney, Agent, or Firm* — The Webb Law Firm

(57) ABSTRACT

The invention relates to a method for isolating biologically active substances from raw plant matter, and more particularly to methods for obtaining microvesicules (with a diameter of 50-1200 nm) from plants of the Amaranthaceae family. The claimed method can be used in the medical, cosmetic and food industries. The technical result of the proposed method for isolating microvesicules is the possibility of isolating microvesicules from plants of the Amaranthaceae family. This technical result is achieved using a method for isolating microvesicules that involves collecting plants of the Amaranthaceae family, grinding same to produce a homogeneous mixture, then removing the liquid fraction from said mixture using a coarse filter, subsequently centrifuging said liquid fraction for 30 minutes at 3000 g and for 60 minutes at 10000 g, then ultracentrifuging the separated supernatant for 90 minutes at 150000 g, then suspending the resulting precipitate in a sodium phosphate buffer in a ratio of 1:10, ultracentrifuging again for 90 minutes at 150000 g, and again suspending the resulting precipitate in a sodium phosphate buffer in a ratio of 1:10, then filtering using a filter with a pore diameter of 1.2 μm.

1 Claim, No Drawings

METHOD FOR ISOLATING MICROVESICULES FROM PLANTS OF THE AMARANTHACEAE FAMILY

CROSS-REFERENCE TO RELATED APPLICATIONS

This application is the United States national phase of International Application No. PCT/RU2022/000020 filed Jan. 25, 2022, and claims priority to Russian Patent Application No. 2021102559 filed Feb. 4, 2021, the disclosures of each of which are hereby incorporated by reference in their entireties.

BACKGROUND OF THE INVENTION

Field of the Invention

A method for isolating microvesicles from plants of the Amaranthaceae family.

Description of Related Art

The invention relates to methods for isolating biologically active substances from raw plant matter, in particular to methods of obtaining microvesicles (50-1200 nm in diameter) from plants of the Amaranthaceae family. The claimed method can be used in the medical, cosmetics and food industries.

From the state of the art a method is known for isolating microvesicles from a culture medium, including centrifugation, successive ultracentrifugation, dissolving the precipitate obtained in FSB and repeated centrifugation; see p. 25, first 2 paragraphs from the reference https://www.researchgate.net/publication/323269152_Isolation_of_extracellular_microvesicles_from_cell_culture_medium_Comparative_evaluation_of_methods.

The main disadvantage of the method listed under paragraph 1 on p. 25 is an inadequate effect, since this method is not able to separate microvesicles according to size from the remaining particles in the precipitate obtained. Another disadvantage is the use of a cell culture medium as a source material for isolation of exosomes, while obtaining the medium requires the consumption of certain reagents (nutrient medium, serum, L-glutamine, sodium pyruvate, antibiotics, solutions for washing such as Hank's solution, ordering and obtaining of registered cell lines, handling of the cell lines or obtaining a cell culture with the subsequent need to describe this cell culture. These stages require some expenditure of materials and time, which makes this method for obtaining microvesicles time-consuming and expensive.

The technical result of the method for isolating microvesicles that we have proposed is the possibility of isolating microvesicles from plants of the Amaranthaceae family.

The above-mentioned technical result is achieved with the use of a method of isolating microvesicles in which plants of the Amaranthaceae are collected and ground to obtain a homogenized mixture, from which by means of a coarse filter the liquid phase is then separated and successively centrifuged for 30 minutes at 3000 g and for 60 minutes at 10 000 g respectively to remove large particles—cell conglomerates and individual cells—from the mixture obtained. The extracted supernatant then undergoes ultracentrifugation for 90 minutes at 150 000 g, and the precipitate obtained is then suspended in a sodium phosphate buffer in the ratio 1:10 and again undergoes ultracentrifugation for 90 minutes at 150 000 g. The ultracentrifugation stages are required for removal of apoptotic bodies, protein conglomerates and proteins>30 kDa from the mixture. The precipitate obtained is then again suspended in sodium phosphate buffer in the ratio 1:10, which is followed by filtration using a filter with a pore diameter of 1.2 m, allowing microvesicles of the required size—up to 1200 nm—to be separated from the remaining particles in the precipitate obtained. Furthermore, we have established experimentally that with this sequence of operations and systems the claimed method enables microvesicles from plants of the Amaranthaceae family to be isolated in the most effective way.

EXAMPLE OF PERFORMING THE CLAIMED METHOD

To an automatic grinder are added 10 g of leaves, flowers and roots of plants of *Amaranthus blitoides* S. Wats (any proportions can be used; achievement of the claimed technical result is not affected, since the microvesicles are contained in the different parts of the plants in approximately equal quantities), with grinding to obtain a homogeneous (uniform) mixture. The liquid phase is then separated by filtration through a screen with a pore diameter of 1-2 mm. Successive centrifugation is then carried out for 30 minutes at 3000 g and for 60 minutes at 10 000 g respectively. The precipitate obtained is then suspended in a sodium phosphate buffer in the ratio 1:10 and ultracentrifugation is again carried out for 90 minutes at 150 000 g. The precipitate obtained is again suspended in a sodium phosphate buffer in the ratio 1:10, following by filtration using a filter with a pore diameter of 1.2 m.

Then 500 µl of the solution obtained is analysed by means of photon correlation spectroscopy (Nanophox Sympatec GmbH, Germany), where sizes in the region of 50-1200 nm are detected, indicating the presence in the solution of microvesicles of the claimed size.

The invention claimed is:

1. A method for isolating microvesicles from a plant, comprising, in order:
   collecting plant material from a plant of the Amaranthaceae family;
   grinding the plant material to obtain a homogonized plant mixture;
   separating a liquid phase from the homogonized plant mixture with a coarse filter;
   centrifuging the liquid phase at 3000 g for 30 minutes and then centrifuging the liquid phase at 10,000 g for 60 minutes to obtain an extracted supernatant;
   centrifuging the extracted supernatant at 150,000 g for 90 minutes to obtain a precipitate;
   suspending the precipitate in a sodium phosphate buffer at a ratio of 1:10 to obtain a suspended precipitate;
   centrifuging the suspended precipitate at 150,000 g for 90 minutes to obtain a second precipitate;
   suspending the second precipitate in a sodium phosphate buffer at a ratio of 1:10 to obtain a second suspended precipitate; and
   filtering the second suspended precipitate with a filter having a pore diameter of 1.2 µm to obtain microvesicles.

* * * * *